United States Patent [19]
Buxton et al.

[11] Patent Number: 5,123,092
[45] Date of Patent: Jun. 16, 1992

[54] EXTERNAL EXPANSION BUS INTERFACE

[75] Inventors: Clark Buxton; Saifee Fakruddin, both of St. Joseph; Mark Foster, Stevensville; Robert Kohtz; Jeff Schindler, both of St. Joseph, all of Mich.

[73] Assignee: Zenith Data Systems Corporation, Buffalo Grove, Ill.

[21] Appl. No.: 260,964

[22] Filed: Oct. 21, 1988

[51] Int. Cl.$^5$ .................... G06F 3/00; G06F 13/00
[52] U.S. Cl. ............................ 395/250; 364/239; 364/239.17; 364/239.2; 364/282.2; 364/284.1; 364/284.2; 364/284.3; 364/DIG. 1
[58] Field of Search .................. 364/200, 900, 250

[56] References Cited

U.S. PATENT DOCUMENTS

| | | | |
|---|---|---|---|
| 4,177,511 | 12/1979 | Taddei | 364/200 |
| 4,218,740 | 8/1980 | Bennett et al. | 364/200 |
| 4,309,754 | 1/1982 | Dinwiddie, Jr. | 364/200 |
| 4,327,408 | 4/1982 | Frissel et al. | 364/200 |
| 4,387,433 | 6/1983 | Cardenia | 364/200 |
| 4,419,728 | 12/1983 | Larson | 364/200 |
| 4,429,362 | 1/1984 | Costantini | 364/200 |
| 4,511,969 | 4/1985 | Koenig et al. | 364/200 |
| 4,545,013 | 10/1985 | Lyon et al. | 364/200 |
| 4,575,714 | 3/1986 | Rummel | 340/568 |
| 4,590,552 | 5/1986 | Guttag et al. | 364/200 |
| 4,594,654 | 6/1986 | Maniar et al. | 364/200 |
| 4,607,328 | 8/1986 | Furukawa et al. | 364/200 |
| 4,642,761 | 2/1987 | Yanagiuchi et al. | 364/200 |
| 4,694,393 | 9/1987 | Hirano et al. | 364/200 |
| 4,716,527 | 12/1987 | Graciotti | 364/200 |
| 4,744,078 | 5/1988 | Kowalczyk | 364/200 |
| 4,794,525 | 12/1988 | Pickert et al. | 364/200 |
| 4,805,090 | 2/1989 | Coogan | 364/200 |
| 4,821,185 | 4/1989 | Esposito | 364/200 |
| 4,885,683 | 12/1989 | Coogan | 364/200 |
| 4,896,266 | 1/1990 | Klashka et al. | 364/200 |
| 4,987,530 | 1/1991 | Wagner et al. | 364/200 |
| 5,014,193 | 5/1991 | Garner et al. | 364/200 |

Primary Examiner—Michael R. Fleming
Assistant Examiner—Ayaz R. Sheikh
Attorney, Agent, or Firm—Flynn, Thiel, Boutell & Tanis

[57] ABSTRACT

A computer bus interface suited to connecting an expansion bus to a computer's internal bus. The interface is capable of selecting and deselecting any devices coupled to the expansion bus by enabling and disabling buffers which intercept signals between the expansion bus and the internal bus.

16 Claims, 3 Drawing Sheets

EXTERNAL EXPANSION BUS INTERFACE

FIELD OF THE INVENTION

This invention relates to the computer art. More specifically, this invention relates to microcomputer bus communications and interfaces for computer bus communications.

BACKGROUND OF THE INVENTION

It is advantageous in certain computer systems to provide standard interface and dimensional requirements for installing compatible devices provided by different vendors. These standards include device physical dimensions, physical connector descriptions, electrical connector descriptions, and signalling protocols for communications between devices and the central processing unit (CPU). Such standards exist and include the S100 bus, EISA bus, PC bus, AT bus, and Microchannel TM bus.

It is also advantageous to miniaturize a computer system for many reasons including to provide for portability or to reduce the computer's use of desk space. All of the aforementioned interfaces have considerable size requirements that limit miniaturization and portability.

One compromise solution to the size problem is to provide a small computer with a removable expansion box. Both space and an interface for standard devices can be provided in the expansion box, while keeping the main computer small.

The use of an expansion box introduces another problem. Devices internal to the computer can often be in conflict with those expansion devices in the expansion box.

Each device or memory location within a computer system has its own unique address. The central processing unit (CPU) communicates with a device by its address. Each device listens to a common bus and responds only to its own address.

If a computer containing a disk drive, for example, is plugged into an expansion box containing a disk drive and both disk drives respond to the same address, there will be a bus contention problem as both disk drives try to respond when their common address is queried. The disk drive internal to the computer can be non-standard. The internal disk drive can be blocked or readdressed to avoid contention problems. The external disk drive in the expansion box must conform to interface specifications. Blocking (deselecting) means are not provided for in any of the three standards mentioned above. The prior art does not provide separate means to execute this function. This problem is not limited to disk drives. It applies to any addressable device in a computer system. Separate selection and deselection means located in a bus interface, independent of the device being selected or deselected, are the subject of this invention.

OBJECTS OF THE INVENTION

It is the object of this invention to provide an interface that can select and deselect devices.

It is another object of this invention to provide an interface for an expansion box for a computer system.

It is another object of this invention to provide an interface for selecting and deselecting devices located in an expansion box which is programmable and can store information as to which device to select or deselect at any given time.

It is another object of this invention to provide an interface for selecting and deselecting devices located in an expansion box which allows devices on both sides of the interface to freely communicate while protecting each device from problems arising from the other side of the interface.

It is another object of this invention to provide an interface for selecting and deselecting devices in an expansion box, in a standard manner whereby all so equipped computers and expansion boxes are compatible and interchangeable.

BRIEF DESCRIPTION OF THE DRAWINGS

Preferred embodiments demonstrating the various objectives and features of the invention will now be described in conjunction with the following drawings.

DETAILED DESCRIPTION OF THE PREFERRED EMBODIMENTS OF THE INVENTION

Figure 1:
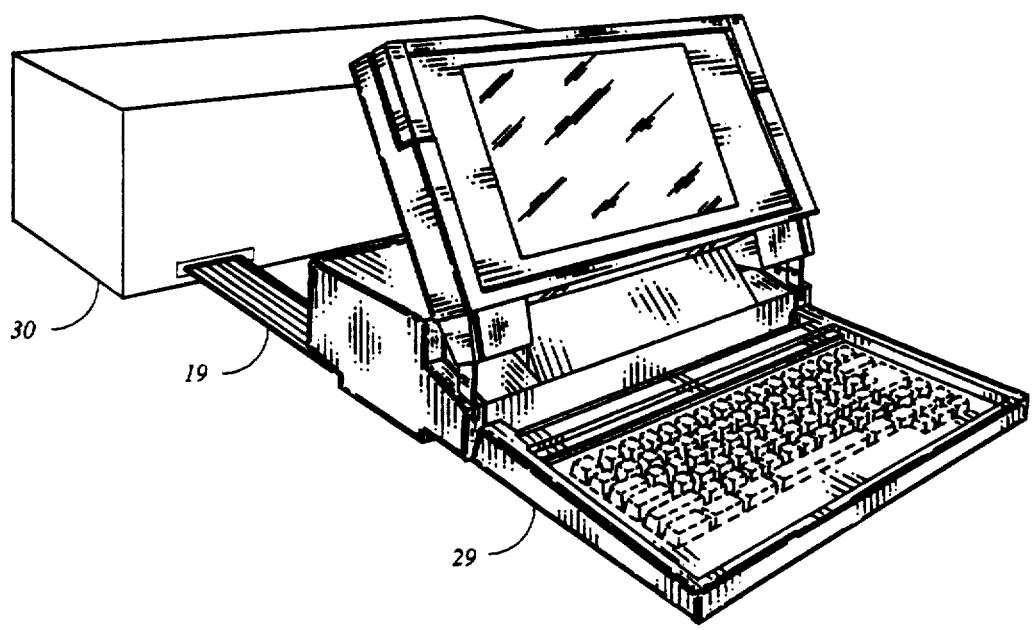
FIG. 1 is a physical representation of the preferred portable computer and expansion box combination.

Referring to FIG. 1, the preferred embodiment is described in terms of a portable microcomputer 29 having a detachable expansion box 30 which receives plug-in devices in accordance with the PC bus standard for device compatibility.

Figure 2:
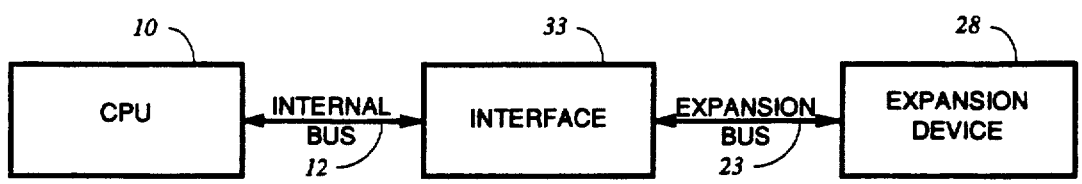
FIG. 2 is a block diagram showing the interface, the part of this system wherein the invention lies.

Referring to FIG. 2, the invention lies in bus interface circuitry 33 which allows for connection of the CPU 10 and internal bus 12 with expansion devices 28 and expansion bus 23.

Figure 3:
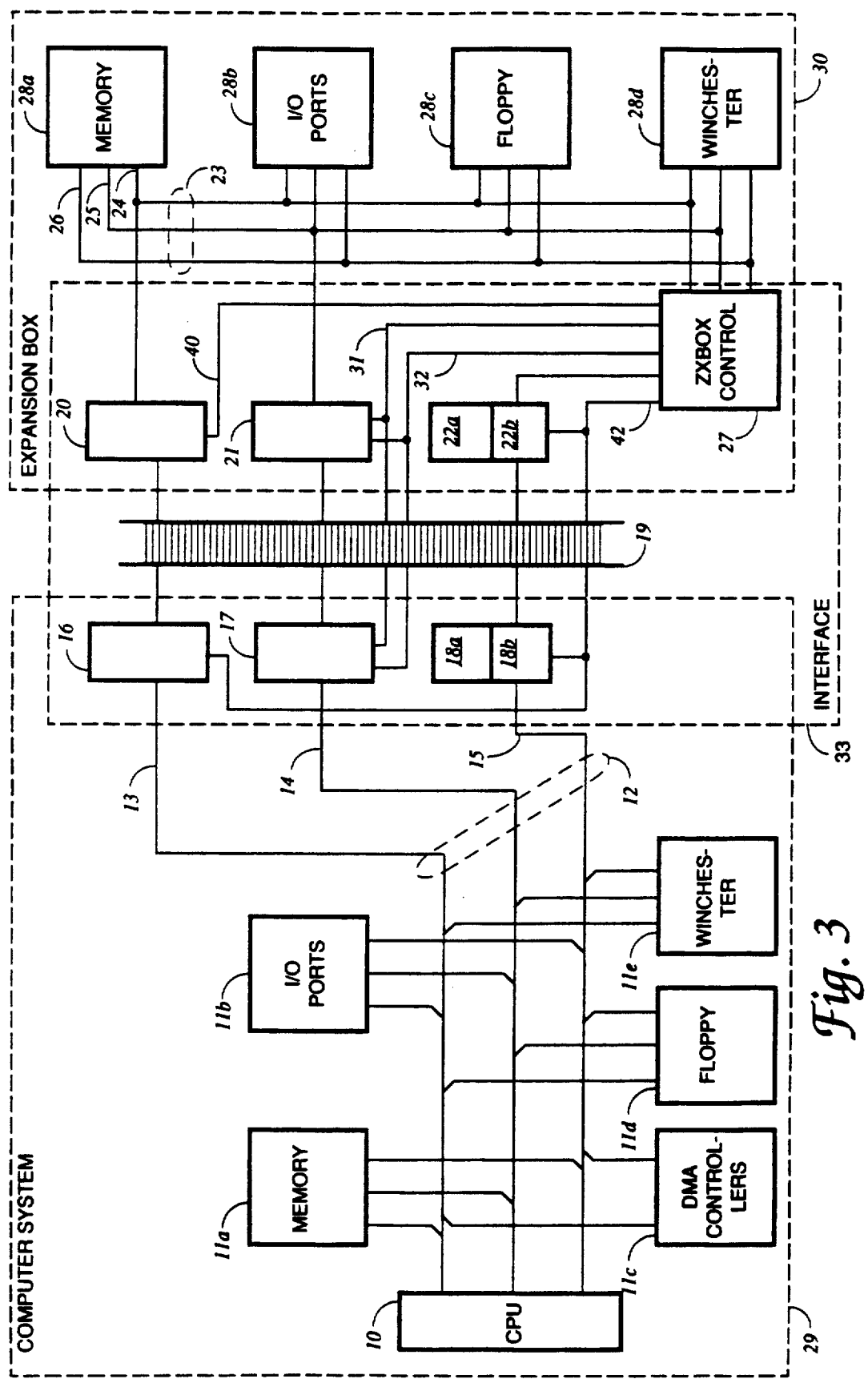
FIG. 3 is a block diagram of the preferred embodiment of the invention showing the major components and their interconnection.

Referring to FIG. 3, buffers 16–18 and 20–22 under the control of the control logic 27 interrupt the flow of digital signals and thereby select and deselect expansion devices 28a–28d. The expansion devices shown include: memory 28a, input/output ports 28b, a floppy disk drive 28c, and a Winchester drive 28d. It is important to note that any device in accordance with the bus standard can be included here. The invention is not limited to the devices shown.

The computer system 29 comprises a CPU 10 and internal devices 11a–11e all interconnected by an internal bus 12. As with the expansion devices 28a–28d, the internal devices 11a–11e are not limited to those shown in the drawing. The internal devices can comprise any number of devices. The devices shown in the drawings are merely an example. For purposes of bus communications the CPU 10 is an internal device. The term internal devices should be understood to include the CPU. The internal bus 12 comprises an internal address bus 13, an internal data bus 14 and an internal control bus 15.

All internal devices 11a–11e and 10 communicate in time-division multiplex synchronization on the internal bus 12 under the control of the CPU. Each internal device 11a–11e has a unique address and receives data from the internal data bus 14 after its unique address appears on the internal address bus 13 and a write signal appears on the internal control bus 15. Each internal device sends data on the internal data bus 14 after its unique address appears on the internal address bus 13 and a read signal appears on the internal control bus 15.

An internal address buffer 16, an internal data buffer 17 and an internal control buffer 18, all connect their respective buses 13-15 to a connector 19. The internal address buffer and the internal control buffer are capable of being enabled or disabled and cause a slight delay in their respective buses. They are a plurality of delay chips of the type like the 74AC11244 made by Texas Instruments. The internal data buffer 17 is operable in three states, enabled in, enabled out and disabled. In the disabled condition both sides are in a tristate condition and neither load or power the data bus. A good example of this type of buffer is the 74ACT11245 made by Texas Instruments. The buffers provide protection to the internal bus from improper connection of the connector 19. As an example, an object charged with static electricity such as a hand, applied directly to the bus can cause serious damage. The internal buffers protect the internal bus from improper bus connection, by isolating the bus from the connector.

Connector 19 connects the computer 29 to the expansion box 30 and their respective buses. The expansion address buffer 20 and the expansion control buffer 22 are of the same type as the internal address buffer 16 and internal control buffer 18. The expansion data buffer 21 is of the same type as the internal data buffer 17.

The expansion bus 23 comprises an expansion address bus 24 connected to the expansion address buffer 20, an expansion data bus 25 connected to the expansion data buffer 21 and an expansion control bus 26 connected to the expansion control buffer 22, via the control logic 27. The expansion bus is in conformance with the PC bus standard and receives expansion devices 28a-28d. The expansion devices may comprise any number of devices. The devices shown in the drawings are merely an example. These devices can be standard devices provided by many different vendors who manufacture devices in accordance with the PC bus standard.

The control logic 27 enables and disables the internal data buffer 17 and the expansion data buffer 21 in response to signals from the expansion control buffer 22, the internal control buffer 18, the internal address buffer 16 and the expansion address buffer 21 according to the following formula:

| Data Buffer State as a Function of Signals on the Control Bus and the Address Bus | | | |
|---|---|---|---|
| Control Buffers | + Address Buffers | = | Data Buffer State |
| Read | Selected Device | | Enabled Out (Box to Computer) |
| Read | Deselected Device | | Disabled |
| Write | Selected Device | | Enabled In (Computer to Box) |
| Write | Deselected Device | | Disabled |

The control logic 27 reads an address from the expansion address buffer 20 and a control signal from the control buffers 18 and 22. In response to a read signal and the address of a deselected device, the control logic sends a disable signal 31 to the internal data buffer 17 and the expansion data buffer 21 to keep a deselected device from reading data from the data bus 25. In response to a read signal and the address of a selected device, the control logic 27 sends a data buffer direction-in signal 32 and an enable signal 31 to the internal data buffer 17 and expansion data buffer 21 to enable data flow from the bus connector 19 to the expansion data bus 25. In response to a write signal and the address of a deselected device, the control logic 27 sends a data buffer disable signal 31 to the internal data buffer 17 and expansion data buffer 21 to keep the deselected device from writing to the internal data bus. In response to a write signal and the address of a selected device the control logic 27 sends a data buffer direction out signal 32 and a data buffer enable signal 31 to the internal data buffer 17 and expansion data buffer 21, to enable data to flow from the expansion data bus 25 to the internal data bus 14.

Referring to FIG. 3, the following data lines are added to connector 19 that are not in the PC bus standard:

ZXBUSEN, Expansion Bus Enable 42. The expansion box drives the ZXBUSEN line active when the expansion box is connected and powered to its normal operating level. The expansion box logic always drives the ZXBUSEN.

DBUFEN, Data Buffer Enable 31. This signal enables the internal data buffer 17 and the expansion data buffer 21. The buffers are disabled during each change of buffer direction, during expansion box programming and when a deselected device is addressed.

DBUFDIR, Data Buffer Direction 32. This signal controls the direction of the internal data buffer 17 and the expansion data buffer 21. High allows data to flow from the computer to the expansion box. Low will allow data to flow from the expansion box to the computer.

Figure 4:
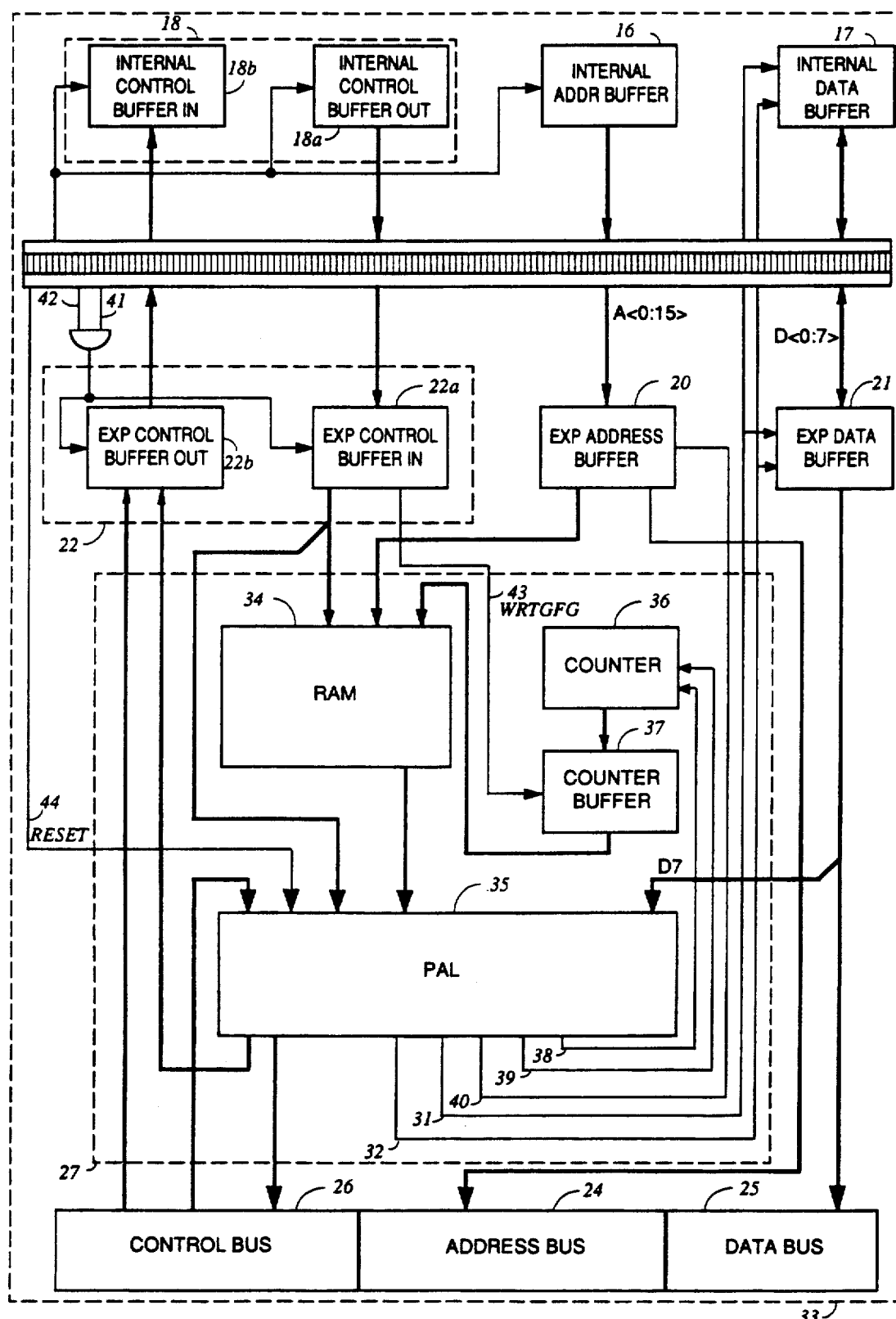
FIG. 4 is a diagram of bus interface for a preferred expansion box.

WRTCFG, Write Configur 43 (FIG. 4). This signal enables the expansion box control or programming cycle. This signal originates from the computer.

All of the power, asynchronous clock, and reserved lines are disconnected from the expansion box connector 19. The remaining, interface standard, data lines are connected through connector 19 to the internal bus 12 and expansion bus 23.

Additional protection is afforded to the internal and expansion buses by enable signals. The ZXBUSEN signal 42 is driven by the expansion box control logic when the expansion box is powered to its normal operating level. The internal buffers are enabled only in response to that signal. Therefore no signals, dangerous voltages, dangerous currents or radio-frequency emissions can pass through the connector to or from the internal bus unless the ZXBUSEN is driven.

The expansion box buffers are enabled only in response to a IOCHK, I/O channel check signal 41. This signal is always set high by the computer. When no computer is attached, the buffers are disabled. This affords the expansion box the same protections mentioned above for the computer.

The control logic has Random Access Memory (RAM) 34 for recording which devices in the expansion box should be enabled or disabled. The memory provides one bit for each I/O location (device) and each kilobyte of memory to designate its state (internal or expansion). These device enabled signals are programmed at system start up.

The RAM 34 receives addresses from either the computer 29 via the address buffer 20 or the counter 36 via the counter buffer 37. The RAM 34 sends the data located at the addresses it receives to the Programmable Array Logic (PAL) 35. The PAL takes inputs from the RAM 34, the inward expansion control buffer 22a, the expansion control bus 26, data line D7 and RESET (the reset control line 39).

The PAL 35 generates expansion device control signals to the expansion control bus 26, return data signals to the internal data buffer 17 and expansion data buffer 21 (for the read RAM function), control signals back to the computer via the outward expansion control buffer 22b. enable 31 and direction 32 signals for the data buffer, an enable signal for the address buffer 40, and increment count 38 and reset count 39 signals for the counter.

The control logic RAM 34 is not normally addressable memory. The memory cannot be written to or read from by conventional memory write or read control signals respectively. The control logic memory therefore cannot be in contention with any normally addressable RAM.

The normal prior art way of changing the value held in a memory location is to send the memory's address with a write signal followed by the data to be written. The control logic RAM is programmed differently. First WRTCFG (Write configur) is set high which, is an extra signal that is not part of the standard bus. It is sent only by the Computer and received only by the expansion box control logic. With the WRTCFG high, the CPU sends read signals to the expansion box. Each address that accompanies a read signal is interpreted by the control logic 27 as an instruction. These instructions are:

RESET_COUNTER EQA 08400H
;Reset expansion bus counter 36 to zero.
IO_EXTERNAL EQA 0C000H
;The current I/O address is in the expansion box.
IO_INTERNAL EQA 0E000H
;The current I/O address is internal.
MEM_EXTERNAL EQA 08000H
;The current memory address is in the expansion box.
MEM_INTERNAL EQA 0A000H
;The current memory address is internal.
IO_EMS_EXTERNAL EQA 0D000H
;The current EMS I/O address is in the expansion box.
IO_EMS_INTERNAL EQA 0F000H
;The current EMS I/O address is internal.
MEM_EMS_EXTERNAL EQA 09000H
;The current EMS memory address is in the expansion box.
MEM_EMS_INTERNAL EQA 0B000H
;The current EMS memory address is internal.
READ_BOX EQA 08800H
;Read from the current address in the expansion box RAM 34.

A counter 36 in the expansion box is incremented with each instruction. The current instruction operates on the memory or I/O device currently addressed by the counter 36. The memory 34 is sequentially accessed and the instructions program the memory with the correct internal or expansion memory or I/O port (device) information.

The information to be programmed is determined by the user through a set up menu and preserved in battery powered CMOS memory in the computer 29.

Expansion box memory programming can be demonstrated by the memory test which is executed at start up.
MOV DX,RESET_COUNTER
; Move the instruction, RESET_COUNTER to register DX.
IN AL,DX
; Send RESET_COUNTER as an address to the expansion box,
; which resets the counter. The intended use of the IN
; instruction is to input what is at the address in register
; DX to register AL. The return data to AL, if any, is
; irrelevant and discarded.
MOV DX,IO_INTERNAL
; Move the instruction, IO_INTERNAL to register DX.
IN AL,DX
; Send IO_INTERNAL as an address to the expansion box.
; This programs the current I/O address as internal and
; increments the counter (the counter increments each
; time a instruction is received).
MOV DX,IO_EXTERNAL
; Move the instruction IO_EXTERNAL to register DX.
IN AL,DX
; Send the instruction IO_EXTERNAL to the expansion box.
MOV DX,RESET_COUNTER
; Move the instruction RESET_COUNTER to register DX.
IN AL,DX
; Send RESET_COUNTER as an address to the expansion box.
MOV DX,MEM_INTERNAL
; Move the instruction MEM_INTERNAL TO REGISTER DX.
IN AL,DX
; Send MEM_INTERNAL as an address to the expansion box.
; This programs the current memory address as internal
; and increments the counter.
MOV DX,MEM_EXTERNAL
; Move the instruction MEM_EXTERNAL to register DX.
IN AL,DX
; Send MEM_EXTERNAL as an address to the expansion box.
MOV DX,RESET_COUNTER
; Move the instruction RESET_COUNTER to register DX.
IN AL,DX
; Send RESET_COUNTER as an address to the expansion box.
MOV DX,READ_XBOX
; Move the instruction READ_XBOX to register DX.
IN AL,DX
; Send READ_XBOX as an address to the expansion box.
; This inputs the memory locations just programed into
; register AL.
TEST AL,TEST_PATTERN
; Compare the input data with the constant $TEST_{13}$ PATTERN
; and determine the difference.
JZ SHORT EXPBUS_ERR
; If the difference is zero jump to the error subroutine.
IN AL,DX
; Send READ_XBOX as an address to the expansion box.

```
; This inputs the contents of the second location to
; register AL.
AND AL,TEST_PATTERN
    ; Calculate the logical and of register AL and the
    ; constant TEST_PATTERN.
JNZ SHORT EXPBUS_ERR
    ; If AL and TEST_PATTERN is not zero jump to
the error
    ; subroutine.
```

This program segment writes a test value to the memory 34, reads it back and tests it against the original.

The invention has been described in terms of a single bus interface for connecting an expansion box to a computer. There are, however, many other uses for the under-lying invention.

Expansion boxes can be coupled in a daisy chain providing unlimited expansion of a computer system. With such a system, a completely modular computer is possible. Each device can be upgraded independently by unplugging one device and plugging in a new one. Service is simplified because a defective device can simply be unplugged and a replacement plugged in. Expansion is simplified because additional devices can be plugged in at any time.

The invention can be applied to a multiple bus system with separate interfaces on each bus. Devices could be configured to communicate on different busses at different times. In a complicated multiple bus system, a series of bus interfaces according to the invention can serve as traffic controllers to schedule the buses.

A separate interface can be provided for each expansion device, eliminating the need for the high speed switching capability of the preferred embodiment. In this case the control logic circuitry can be reduced to a switch that turns the buffers off or on.

The invention can be used in a one piece computer system by eliminating the connector. This would provide for protection of a computer system used to test unreliable devices such as prototypes or devices in need of repair. Such devices can be connected and used with a computer system without concern of damage to the computer. The suspect device can be added to or removed from the system instantly by the control logic to facilitate rapid testing.

Although described above in terms of the preferred embodiment and a few examples of alternate embodiments, the present invention is set forth with particularity in the appended claims. Such modifications and alterations as would be apparent to one of ordinary skill in the art and familiar with the teachings of this application shall be deemed to fall within the spirit and scope of the invention.

We claim:

1. An apparatus comprising: a central processing unit, a bus interface for selecting and deselecting one or more expansion devices, an internal bus coupling the bus interface to the central processing unit, and an expansion bus coupling the bus interface to the expansion devices, the bus interface including at least one internal buffer coupled to the internal bus for buffering signals to and from the internal bus, a connector coupled to the internal buffers for attaching and removing the expansion bus, at least one expansion buffer coupled to the connector and to the expansion bus for buffering signals to and from the expansion bus, and control logic means responsive to signals received from said central processing unit across said internal bus and through said internal buffer, said connector and said expansion buffer for enabling and disabling the internal or expansion buffers so coupled, whereby the expansion devices are also enabled and disabled.

2. The apparatus of claim 1, wherein the control logic circuitry enables or disables the internal or expansion buffers in response to an enable or disable signal from the computer.

3. The apparatus of claim 1, wherein the control logic circuitry comprises memory for storing information as to which expansion devices should be enabled or disabled, and means for enabling or disabling at least one of the buffers in response to an address and stored information.

4. The apparatus of claim 1, wherein said control logic means produces an output signal which is coupled to said internal buffer, said internal buffer being respectively enabled and disabled when said output signal from said control logic means is respectively actuated and deactuated.

5. The apparatus of claim 1, wherein the expansion buffers are enabled only in response to a signal from the computer.

6. A method of enabling and disabling communication between a central processing unit and each of a plurality of devices coupled through buffer means to a bus which in turn is coupled to the central processing unit, each said device having a respective address, and said buffer means including an address buffer and a data buffer, said method comprising the steps of: storing in a storage arrangement for each said device an indication of whether communication for that device is to be enabled for said address thereof; transferring an address from the central processing unit to the address buffer; reading the address from the address buffer; disabling the data buffer when the address buffer contains the address of one of said devices for which the storage arrangement contains an indication that communication is to be disabled; and enabling the data buffer when the address buffer contains the address of one of said devices for which the storage arrangement contains an indication that communication is to be enabled.

7. A method of communicating between first and second devices via a data path between the devices and a computer bus between the devices which includes a plurality of address lines, a plurality of data lines, a read signal line, and a write signal line without causing contention with other devices regardless of their addresses, said method comprising the steps of:

sending a first signal from said first device to said second device on the data path that noncontending communications are beginnings;

sending a read signal from said first device to said second device on the read signal line while sending an address on the address lines whereby the address can be interpreted as an instruction or data; and sending a second signal from said first device to said second device on the data path, to indicate that normal communications are resuming.

8. The method according to claim 7, comprising in addition the steps of repeating said steps of sending said first, read and second signals, incrementing a count once each time said repeating step is carried out, and using said count to apply each instruction or datum sequentially to a plurality of divisions within one of the devices.

9. The method according to claim 8 wherein the divisions are memory cells, and wherein said using step is carried out by applying each instruction or datum to a respective cell in the memory.

10. A method of detecting a central processing unit through a bus interface, the bus interface being coupled by an internal bus to the central processing unit and by an expansion bus to one or more expansion devices, comprising the steps of:

selecting a line of the expansion bus which is normally driven by the central processing unit in a predetermined manner through the internal bus and the bus interface, testing for the selected line of the expansion bus being driven in said predetermined manner in which the central processing unit would drive the line, and testing for the selected line being driven in a manner which is different from said predetermined manner in which the central processing unit would drive the line and which is a manner in which a device other than said central processing unit would drive the selected line.

11. An apparatus, comprising: a processor; an internal bus coupled to said processor; external device means; an external bus coupled to said external device means; selectively actuable buffer means for respectively permitting and preventing information transfer between said internal bus and external bus when respectively enabled and disabled; memory means for storing information defining for a specified address whether said external device means is to be prevented from responding to said specified address; control means responsive to receipt of said specified address from said processor across said internal bus for disabling said buffer means when said information in said memory means indicates said external device means is to be prevented from responding to said address; and means responsive to said processor for enabling and disabling a predetermined mode of operation, said control means being responsive to said predetermined mode of operation for loading into said memory means information sent by said processor across said internal bus and for preventing said external device means from responding to any address sent by said processor across said internal bus.

12. An apparatus according to claim 11, wherein said means for enabling and disabling said predetermined mode of operation includes a signal line which is controlled by said processor and is coupled to said control means, said signal line carrying a signal which has first and second logical states to indicate that said predetermined mode of operation is respectively enabled and disabled.

13. An apparatus according to claim 11, wherein said control means includes a counter having outputs coupled to address inputs of said memory means, said control means incrementing said counter each time said control means loads a unit of information from said processor into said memory means.

14. An apparatus according to claim 13, wherein said control means is responsive to a predetermined information pattern sent by said processor across said internal bus during said predetermined mode of operation for resetting said counter.

15. An apparatus according to claim 13, wherein said information loaded into said memory means by said control means during said predetermined mode of operation is sent by said processor on address lines of said internal bus.

16. An apparatus as recited in claim 11, wherein said memory means includes a plurality of bits which each correspond to at least one address, each said bit having first and second logical states which respectively indicate that said external device means is to be respectively permitted to and prevented from responding to each address associated with such bit.

* * * * *